(No Model.) 2 Sheets—Sheet 1.
J. W. STRICKLE & J. V. PETTY.
BICYCLE SUPPORT.
No. 594,813. Patented Nov. 30, 1897.
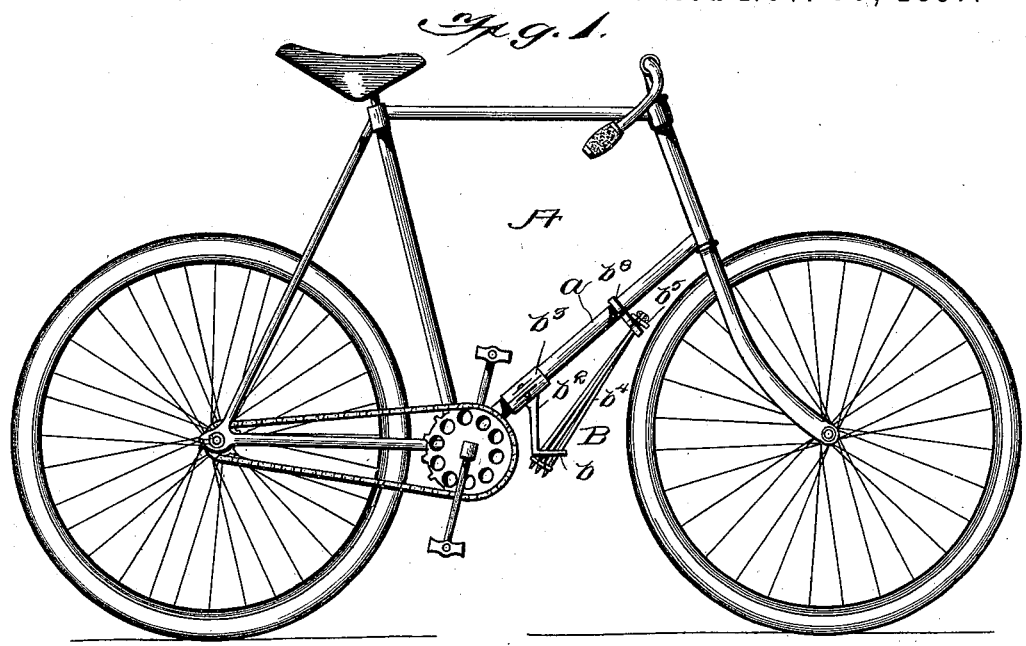
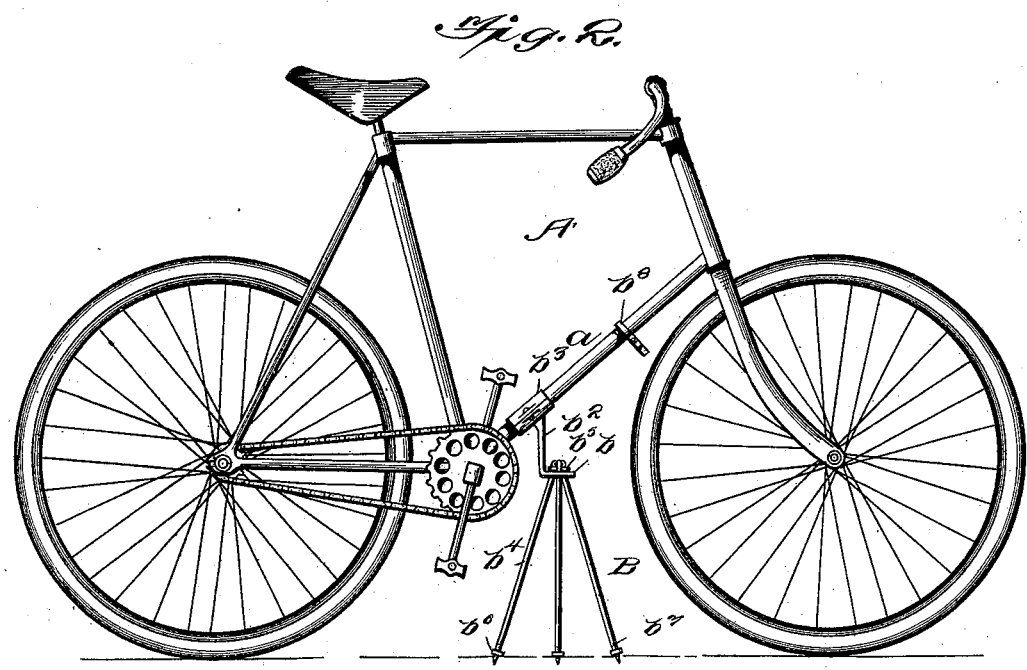
WITNESSES
INVENTORS
Jacob W. Strickle,
John V. Petty,
by John Wedderburn Attorney (No Model.) 2 Sheets—Sheet 2.
J. W. STRICKLE & J. V. PETTY.
BICYCLE SUPPORT.
No. 594,813. Patented Nov. 30, 1897.
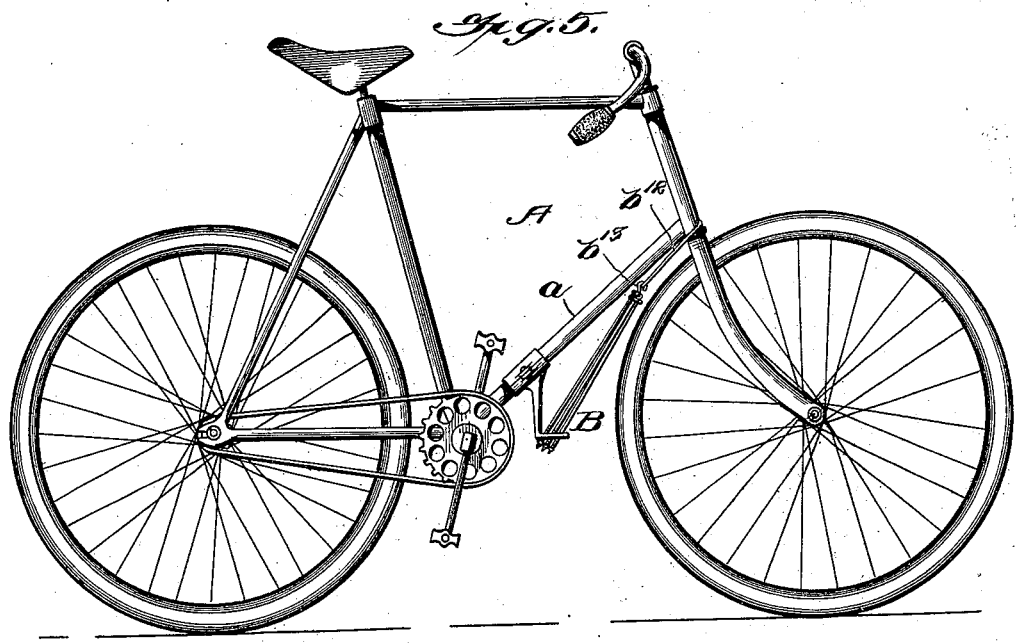
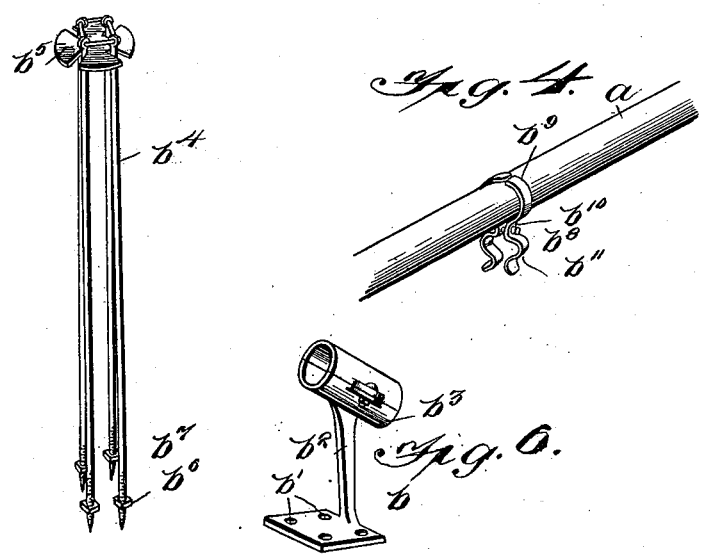
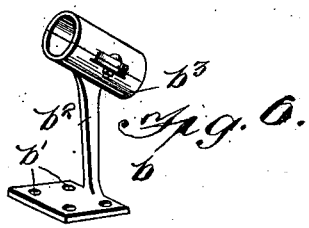
WITNESSES
INVENTORS
Jacob W. Strickle,
John V. Petty,
by John Wedderburn Attorney

UNITED STATES PATENT OFFICE.

JACOB W. STRICKLE AND JOHN V. PETTY, OF HUNTSVILLE, ALABAMA.

BICYCLE-SUPPORT.

SPECIFICATION forming part of Letters Patent No. 594,813, dated November 30, 1897.

Application filed November 6, 1896. Serial No. 611,221. (No model.)

*To all whom it may concern:*

Be it known that we, JACOB W. STRICKLE and JOHN V. PETTY, citizens of the United States, residing at Huntsville, in the county of Madison and State of Alabama, have invented certain new and useful Improvements in Bicycle-Supports; and we do hereby declare the following to be a full, clear, and exact description of the invention, such as will enable others skilled in the art to which it appertains to make and use the same.

Our invention relates to an improvement in bicycle-supports, our object being to provide a construction of support which can be carried upon the machine.

To this end the invention consists in the various matters hereinafter described and claimed.

In the accompanying drawings, which illustrate the invention, Figure 1 is a side view of a bicycle provided with the present support, said support being shown in its closed position. Fig. 2 is a similar view of a bicycle, the support being shown in its open position. Fig. 3 is a detail of the supporting-legs. Fig. 4 is a detail of the clamp for holding the supporting-legs when not in use, said clamp being shown in its position upon the bar of the machine. Fig. 5 is a side view of the machine, showing a modification. Fig. 6 is a detail perspective view of the plate.

Referring now more particularly to the drawings, A represents a bicycle of ordinary construction, and $a$ the lower front supporting tube thereof, while B represents the present support. Generally speaking, the present support comprises a plate secured upon the supporting-tube $a$ of a bicycle-frame, said plate having openings therein which receive legs pivoted at their upper ends to a second plate, the upper ends of the legs in their pivoted position lying closer together than do the openings through the plate attached to the tube of the frame, so that when the legs are let down they will be separated and thus form a broad support for the machine. When, however, the legs are raised, they lie close together and can be held in their raised position upon the supporting-tube.

Passing to the details of construction, $b$ represents a plate having openings $b'$ formed therein, said plate being adapted to lie substantially parallel to the ground and having extending from one side a shank $b^2$, upon which is formed one of the members of a split sleeve $b^3$. The member of the split sleeve to which the shank is attached is adapted to lie on the under side of the lower supporting-tube of the frame, while the other member of the sleeve lies above said tube, each of the sleeve members having lugs extending laterally from the same, said lugs being adapted to receive suitable bolts for holding the sleeve firmly upon the tube of the frame.

Legs $b^4$ extend through the openings $b'$ in the plate $b$ and are pivoted at their upper ends to a plate $b^5$, this plate being provided with recesses in which the upper ends of the legs $b^4$ lie. As has been above mentioned, the upper ends of the legs are pivoted closer together than are the openings in the plate $b$, so that when the legs are drawn upwardly their lower ends lie in the openings in the plate $b$, while their upper ends converge. When, however, the plate $b^5$ with its legs is lowered, the legs are separated and form a broad support. Preferably, as here shown, nuts $b^6$ are provided upon threaded portions $b^7$ near the lower pointed ends of the legs, said nuts forming movable shoulders which limit the distance the ends of the legs can enter in the ground and also prevent said legs from being pulled entirely through the plate $b$ when the legs are closed.

Means are provided for holding the legs in their closed position. As shown in Figs. 1, 2, and 4, there is provided a split clamp $b^8$, having curved arms $b^9$, adapted to embrace the top of the frame, said arms having substantially straight portions $b^{10}$ extending downwardly from the same to receive a bolt by which the clamp is secured in place, while below these straight portions $b^{10}$ are resilient arms $b^{11}$, between which the upper ends of the legs fit in order to hold said legs in their closed position. A slight modification of this is shown in Fig. 5. In this construction a rubber $b^{12}$ is secured to the front fork of the machine and the hook $b^{13}$ is provided upon the plate $b^5$, said hook being adapted to engage the rubber. By this construction the legs are always pulled forward to their fullest extent, in this way preventing any rattling of said legs when the machine is in motion.

It will thus be seen that there is provided a simple and light support which can be readily attached to any machine and carried with said machine, said support being so constructed that it can be folded entirely out of the way when not in use, but can be opened to afford a firm support for the machine when needed.

Having thus described our invention, what we claim as new, and desire to secure by Letters Patent, is—

1. A bicycle-support comprising a horizontal plate carrying a plurality of openings therein, a vertical shank upon said plate, a split inclined sleeve upon said shank adapted to engage the tubing of the bicycle-frame, legs extending down through the openings in said plate, and a slotted plate connecting the upper ends of said legs, substantially as described.

2. A bicycle-support comprising a horizontal plate having a plurality of openings formed therein, a vertical shank upon said plate, a split inclined sleeve upon said shank adapted to engage the tubing of the bicycle, legs extending through the openings in said plate, a slotted plate in which the upper ends of the legs are mounted, a wire flexibly connecting the upper ends of said legs to hold the same in the slots of the slotted plate, and means for holding the legs in an elevated position when so desired, substantially as described.

3. In a bicycle-support, the combination with a plate having openings therein, means upon said plate for securing the same to the frame of the bicycle, legs extending through the openings in said plate, a second plate to which the upper ends of the legs are pivotally attached, a hook upon said second plate, and an elastic member adapted to be secured to the frame of a bicycle so as to be engaged by the hook to hold the legs in an elevated position, substantially as described.

In testimony whereof we have signed this specification in the presence of two subscribing witnesses.

JACOB W. STRICKLE.
JOHN V. PETTY.

Witnesses:
 E. W. WINERGHT,
 W. S. SMITH.